United States Patent
Marsilio et al.

(10) Patent No.: US 7,104,396 B2
(45) Date of Patent: Sep. 12, 2006

(54) MEDIA STORAGE CONTAINER

(75) Inventors: Ronald M. Marsilio, Canton, OH (US); Vincent C. M. Leesberg, Erp (NL)

(73) Assignee: Nexpak Corporation, Uniontown, OH (US)

(*) Notice: Subject to any disclaimer, the term of this patent is extended or adjusted under 35 U.S.C. 154(b) by 327 days.

(21) Appl. No.: 10/295,354

(22) Filed: Nov. 15, 2002

(65) Prior Publication Data

US 2003/0102231 A1   Jun. 5, 2003

Related U.S. Application Data

(60) Provisional application No. 60/337,518, filed on Dec. 3, 2001.

(51) Int. Cl.
*B65D 85/30* (2006.01)

(52) U.S. Cl. ............... 206/308.1; 206/311; 206/312

(58) Field of Classification Search ........... 206/308.1, 206/307, 309, 310, 311, 312, 313, 303, 232, 206/387
See application file for complete search history.

(56) References Cited

U.S. PATENT DOCUMENTS

| | | | |
|---|---|---|---|
| 1,186,312 A | 6/1916 | Hanselmann | |
| 4,199,061 A | 4/1980 | Harkleroad | |
| 4,327,831 A | 5/1982 | Inaba et al. | |
| 4,709,812 A | 12/1987 | Kosterka | |
| 4,823,950 A * | 4/1989 | Roze | 206/311 |
| 5,188,230 A | 2/1993 | O'Brien et al. | |
| 5,219,417 A | 6/1993 | O'Brien et al. | |
| 5,246,107 A * | 9/1993 | Long et al. | 206/308.1 |
| 5,269,409 A | 12/1993 | Brandt et al. | |
| 5,284,242 A | 2/1994 | Roth et al. | |
| 5,291,990 A | 3/1994 | Sejzer | |
| 5,307,927 A | 5/1994 | Curtis et al. | |
| 5,310,053 A | 5/1994 | Lowry et al. | |
| 5,372,253 A | 12/1994 | O'Brien et al. | |
| 5,402,882 A | 4/1995 | Bandy et al. | |
| 5,422,875 A | 6/1995 | Bribach | |
| 5,469,961 A | 11/1995 | Chang | |
| 5,501,540 A * | 3/1996 | Ho | 402/73 |
| 5,575,387 A | 11/1996 | Gelardi | |
| 5,634,559 A | 6/1997 | Foos et al. | |
| 5,697,496 A | 12/1997 | Bauer | |
| 5,788,069 A | 8/1998 | Calhoun, III et al. | |
| 5,791,468 A | 8/1998 | House | |
| 5,819,928 A | 10/1998 | Wynalda, Jr. | |
| D403,197 S * | 12/1998 | Bandy et al. | D6/634 |
| 5,884,761 A | 3/1999 | Gelardi et al. | |
| 5,894,924 A | 4/1999 | Koch | |
| 6,059,102 A | 5/2000 | Gelardi et al. | |
| 6,068,116 A * | 5/2000 | Bankhead | 206/232 |
| 6,106,015 A * | 8/2000 | Udwin et al. | 281/29 |
| 6,250,462 B1 | 6/2001 | Kato | |

(Continued)

FOREIGN PATENT DOCUMENTS

EP    1 225 586 A2    7/2002

(Continued)

*Primary Examiner*—Faye Francis
(74) *Attorney, Agent, or Firm*—Zollinger & Burleson

(57) ABSTRACT

A media storage container has at least one media storage tray connected to a flexible cover with a mechanical connection. One embodiment of the media storage container includes two media storage trays connected together with a mechanical connection that traps an inner cover member between the media storage trays to connect the cover to the trays. Embodiments are provided wherein the inner cover member is connected to one outer cover member and two outer cover members.

21 Claims, 11 Drawing Sheets

U.S. PATENT DOCUMENTS

| | | | |
|---|---|---|---|
| 6,276,523 B1 * | 8/2001 | Sanders | 206/308.1 |
| 6,283,283 B1 | 9/2001 | Rufo, Jr. et al. | |
| 6,349,823 B1 | 2/2002 | Innis | |
| 2002/0094394 A1 | 7/2002 | Wynalda, Jr. et al. | |
| 2002/0119293 A1 | 8/2002 | Wynalda, Jr. | |
| 2003/0106815 A1 * | 6/2003 | Myszka | 206/308.1 |

FOREIGN PATENT DOCUMENTS

| | | |
|---|---|---|
| GB | 2274452 A | 7/1994 |

* cited by examiner

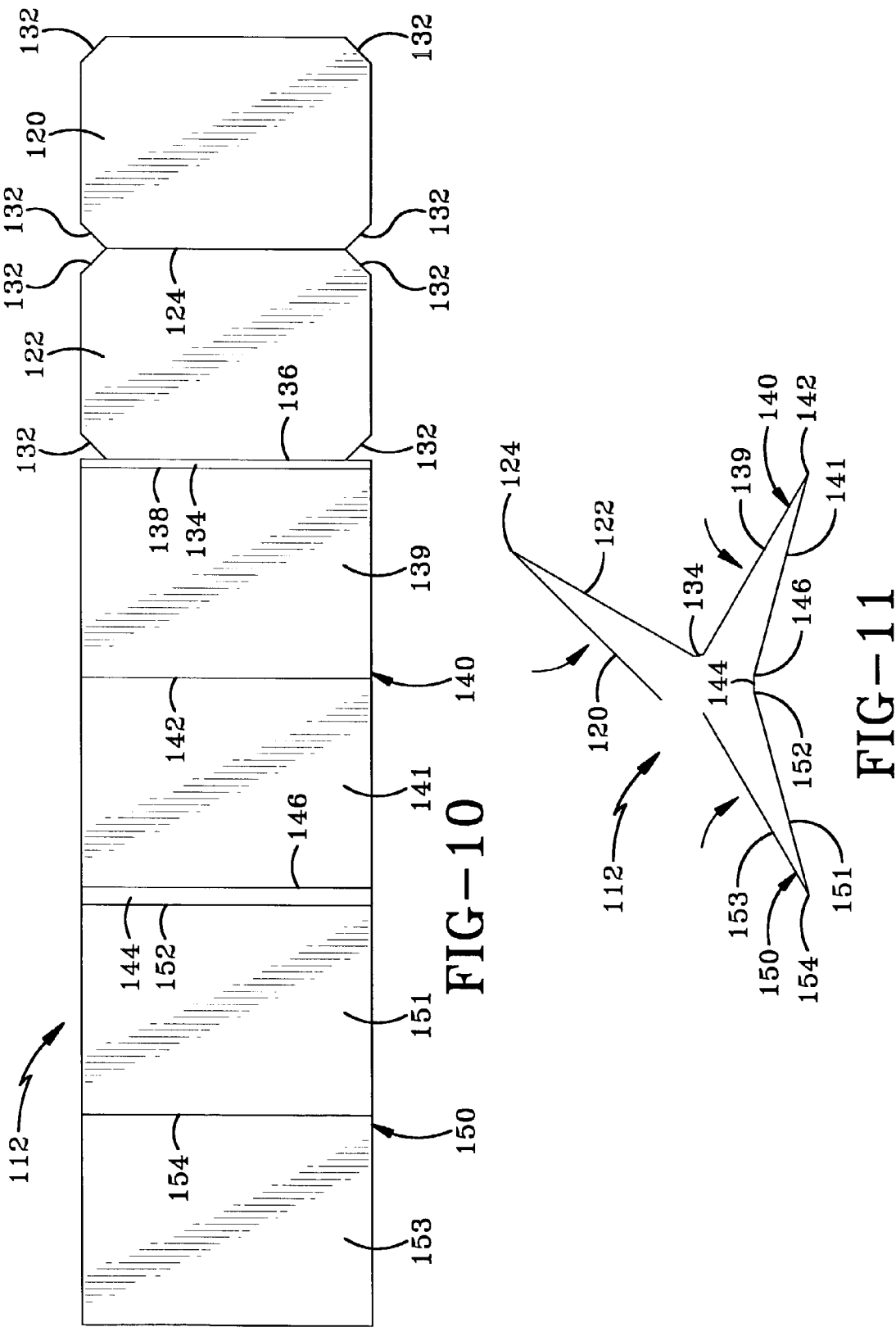

MEDIA STORAGE CONTAINER

CROSS-REFERENCE TO RELATED APPLICATIONS

This application claims priority from U.S. provisional application Ser. No. 60/337,518 filed Dec. 3, 2001; the disclosures of which are incorporated herein by reference.

BACKGROUND OF THE INVENTION

1. Technical Field

The present invention generally relates to media storage containers and, more particularly, to media storage containers that include elements fabricated from paperboard and plastic. Specifically, the present invention relates to a media storage container having plastic media holding trays connected to paperboard cover members without adhesives.

2. Background Information

Various types of paperboard media storage containers are known in the art. Some of these containers utilize plastic media-holding trays connected to the paperboard cover members. Although some of the devices use connecting arrangements that secure the paperboard to the plastic media holding tray without adhesive, most of the containers known in the art use an adhesive to connect the two elements together. The known media storage containers that form the connection without adhesive leave room for improvement. The art desires that these connections securely hold the rigid media storage trays to the paperboard cover members while being simple to manufacture and assemble. The art also desires this type of media storage container to hold multiple items of recorded media in a single container.

BRIEF SUMMARY OF THE INVENTION

The invention provides a media storage container that having at least one rigid media storage tray connected to a flexible cover with a mechanical connection. In one embodiment, the invention provides two media holding trays that include elements that snap together to trap a portion of the flexible cover between the trays to hold the cover to the trays.

The invention provides one embodiment of the media storage container wherein the spine is split in another embodiment wherein the spine is whole.

BRIEF DESCRIPTION OF THE SEVERAL VIEWS OF THE DRAWINGS

FIG. 8 is a view similar to FIG. 5 showing the cover being closed on the media holding trays.

FIG. 10 is a top plan view of the cover of the second embodiment of the invention in an unfolded condition.

FIG. 11 is an end view of the second embodiment of the cover with the panels being initially folded upon each other.

FIG. 16 is a view similar to FIG. 13 showing the cover in a closed condition.

Similar numbers refer to similar parts throughout the specification.

DETAILED DESCRIPTION OF THE INVENTION

Figure 1:
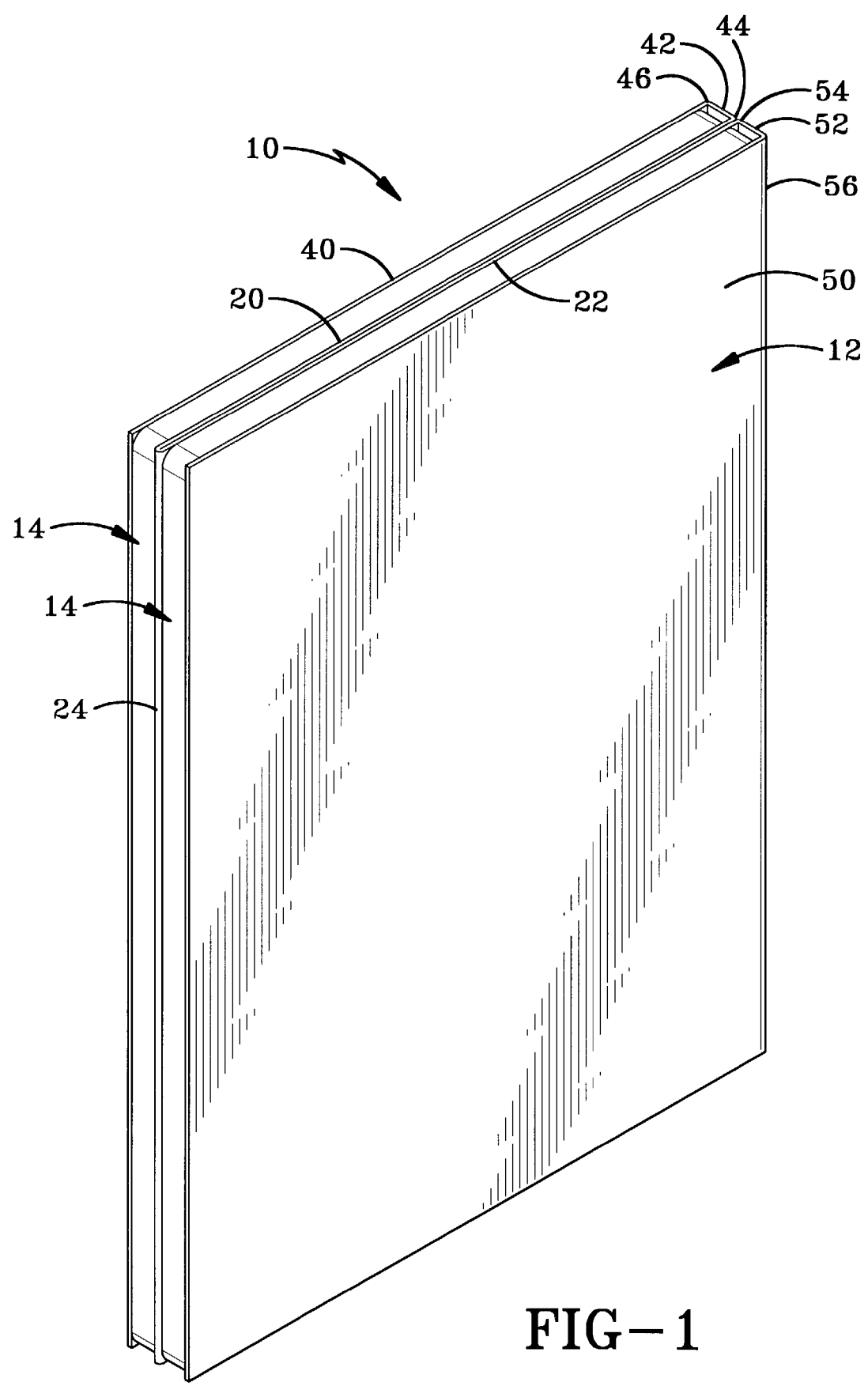
FIG. 1 is a perspective view of the first embodiment of the invention showing the media storage container in its closed configuration.

The first embodiment of the media storage container is indicated generally by the numeral 10 in FIGS. 1–8. Media storage container 10 generally includes a cover 12 and at least one but preferably two media storage trays 14. Cover 12 is fabricated from a relatively flexible material and may be preferably fabricated from a paper-based material such as paperboard. The paperboard may include smooth outer surfaces with a layer disposed between the smooth outer surfaces. The smooth outer surfaces are useful for displaying printed information about the contents of the media stored by trays 14. Media storage trays 14 are preferably fabricated from a relatively rigid material such as a plastic. In other embodiments, trays 14 may be fabricated from a paper-based material, a metal, wood, or a variety of other materials known to those skilled in the art. In accordance with one of the objectives of the invention, trays 14 are connected to cover 12 without the use of adhesive. Trays 14 are thus connected to cover 12 with a mechanical connection that forms an interference fit between trays 14 and cover 12.

Cover 12 is fabricated from a single piece of material that is divided into a plurality of panels by living hinges. Cover 12 includes first 20 and second 22 inner cover panels that are configured to fold together in a back-to-back configuration when trays 14 are attached to cover 12. First panel 20 is connected to second panel 22 with a first living hinge 24. Living hinge 24 may be formed by scoring the material of cover 12, may be formed by embossing a line across cover 12, or by other methods known to those skilled in the art. First and second inner cover panels 20 and 22 each have a height (measured in the direction of reference arrow 26 in FIG. 3) and a width (in the direction of reference arrow 28 in FIG. 3). Height 26 and width 28 are varied as media storage container 10 is designed to hold different types of recorded media. For instance, height 26 and width 28 are equal to one set of dimensions when media storage container 10 is used to hold CDs and dimensions 26 and 28 are equal to a different set of dimensions when media storage container 10 is used to hold DVDs. Media storage container 10 may also be configured to hold VHS tapes, cassette tapes, memory chips, mini discs, and other types of items of recorded media known in the art.

Figure 4:
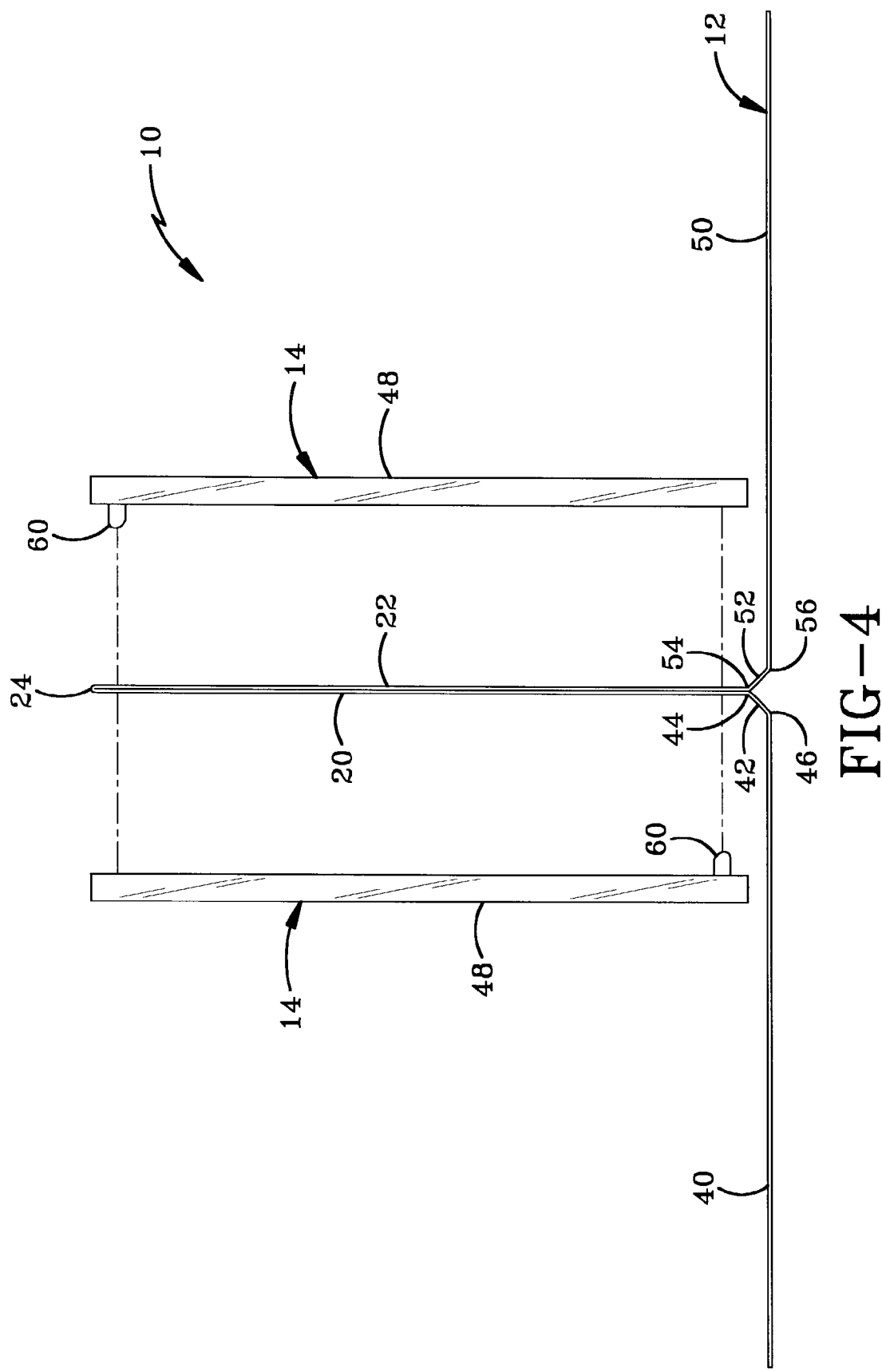
FIG. 4 is an end view showing the cover folded to receive the media holding trays.

First and second inner cover panels 20 and 22 define openings 30 that align with one another when cover panels 20 and 22 are in the back-to-back configuration depicted in FIG. 4. In the embodiment of the invention depicted in the drawings, each panel 20 and 22 defines four openings 30 with each opening 30 being disposed adjacent one of the corners of one of panels 20 and 22.

A front outer cover 40 is connected to first inner cover panel 20. A first spine panel is disposed between front cover panel 40 and first inner cover panel 20. First spine panel 42 is connected to first inner cover panel 20 with a second living hinge 44. First spine panel 42 is connected to front cover panel 40 with a third living hinge 46. First spine panel 42 has a width slightly larger than the thickness of tray 14 so that front cover panel 40 is disposed against the front surface 48 when front cover panel 40 is closed as depicted in FIG. 8.

Cover 12 also includes a rear cover panel 50 that is connected to second inner cover panel 22. A second spine panel 52 is disposed between rear cover panel 50 and second inner cover panel 22. Second spine panel 52 is connected to second inner cover panel 22 with a fourth living hinge 54. Second spine panel 52 is connected to rear cover panel 50 with a fifth living hinge 56. Second spine panel 52 has a width substantially equal to first spine panel 42 such that rear cover panel 50 lies against front surface 48 of media storage tray 14 when cover 12 is closed as depicted in FIG. 8.

Figure 6:
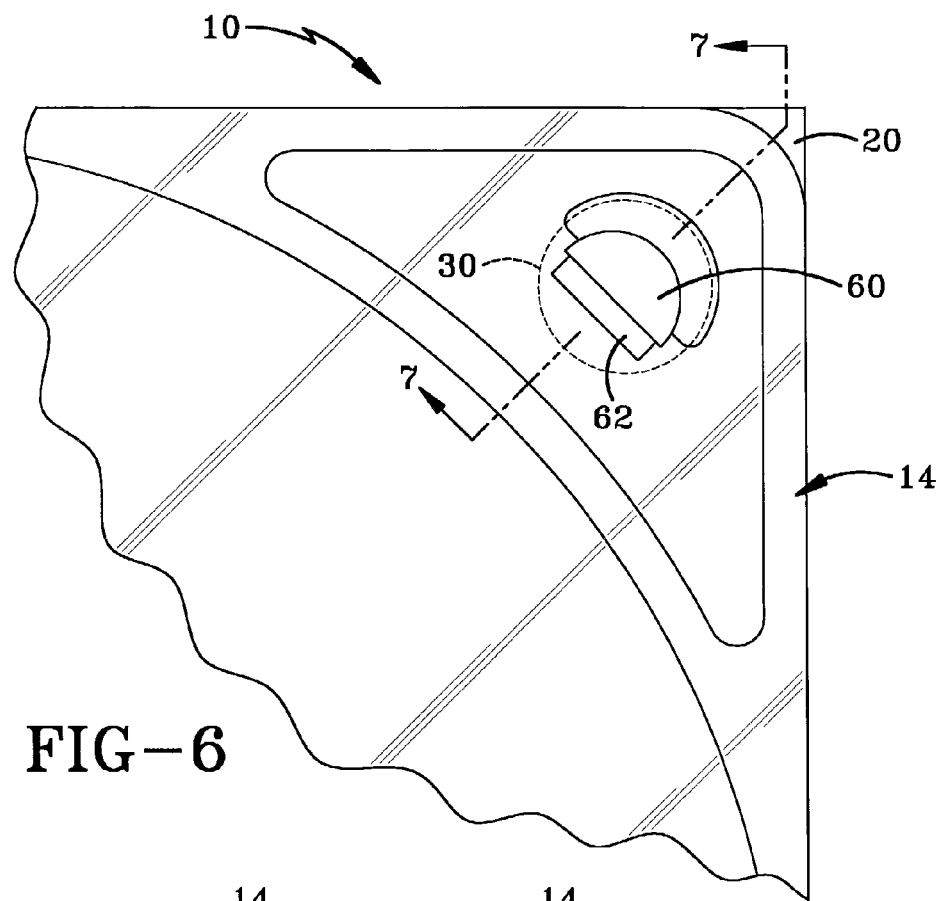
FIG. 6 is a front view of one of the locking fingers taken along line 6—6 of FIG. 5.
Figure 7:
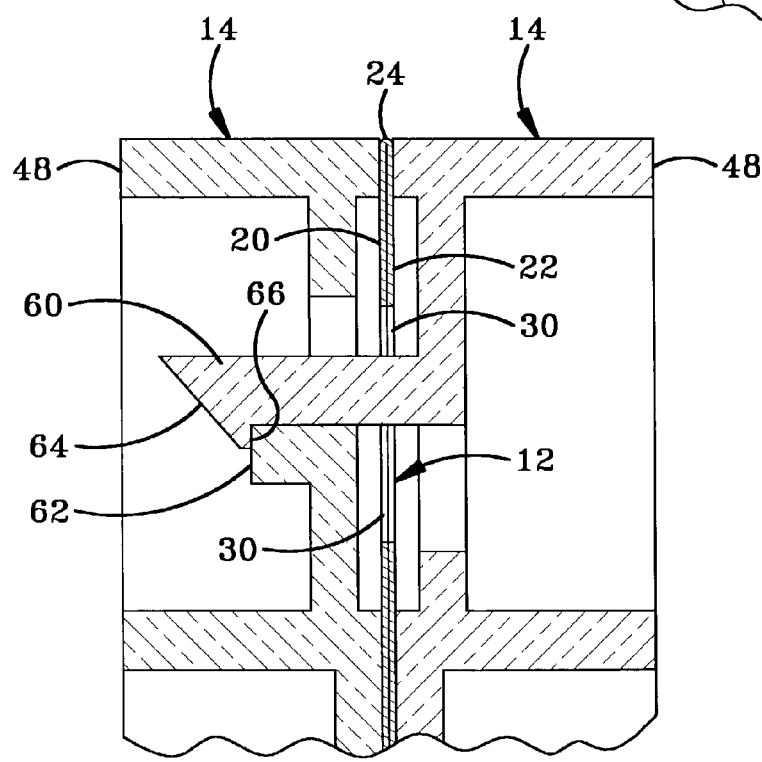
FIG. 7 is a section view taken along line 7—7 of FIG. 6.

Trays 14 are connected to cover 12 with mechanical connections that create an interference fit between trays 14 and cover 12 such that trays 14 are locked to cover 12 once the mechanical connection is created. In the exemplary embodiment, each tray 14 includes a pair of locking fingers 60. Locking fingers 60 are positioned on trays 14 such that they are aligned with openings 30 as depicted in FIGS. 4 and 6. Locking fingers 60 are disposed at opposite corners disposed diagonally across tray 14 such that there are locking fingers 60 disposed at all four corners when two trays 14 are disposed back-to-back as depicted in FIG. 4. In this configuration, the tray on the left includes two locking fingers 60 and the tray on the right includes two locking fingers 60. Both trays 14 have the same configuration. Each tray 14 also defines a locking ledge 62 as depicted in FIGS. 6 and 7 that is adapted to receive locking finger 60 in a one-way snap fit connection as depicted in FIG. 7. To facilitate this type of locking connection, each locking finger 60 includes an angled surface 64 and a locking surface 66. Locking surface 66 is disposed substantially perpendicular to the longitudinal direction of locking fingers 60.

Figure 2:
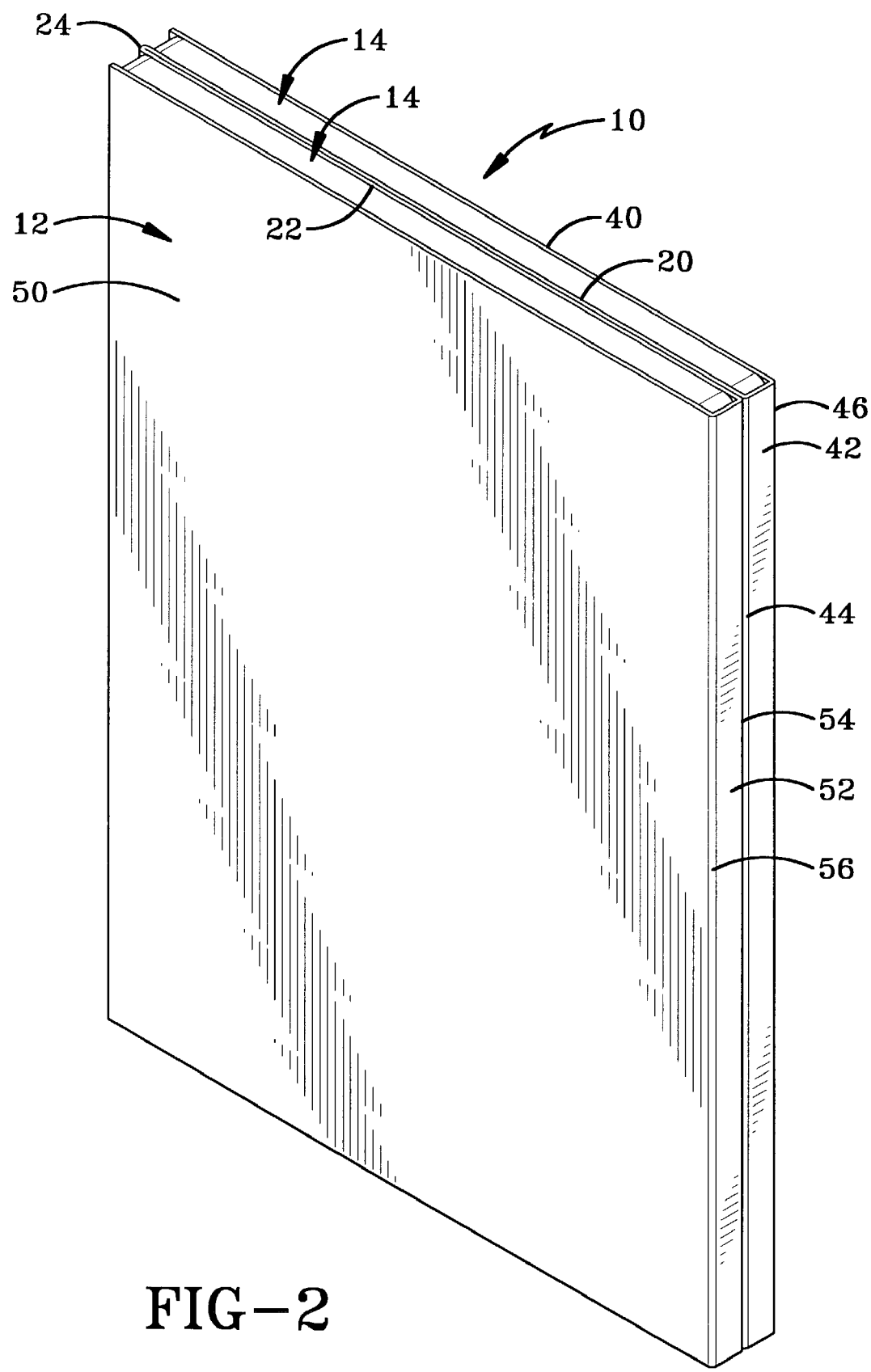
FIG. 2 is a perspective view showing the split spine of the first embodiment of the invention.
Figure 3:
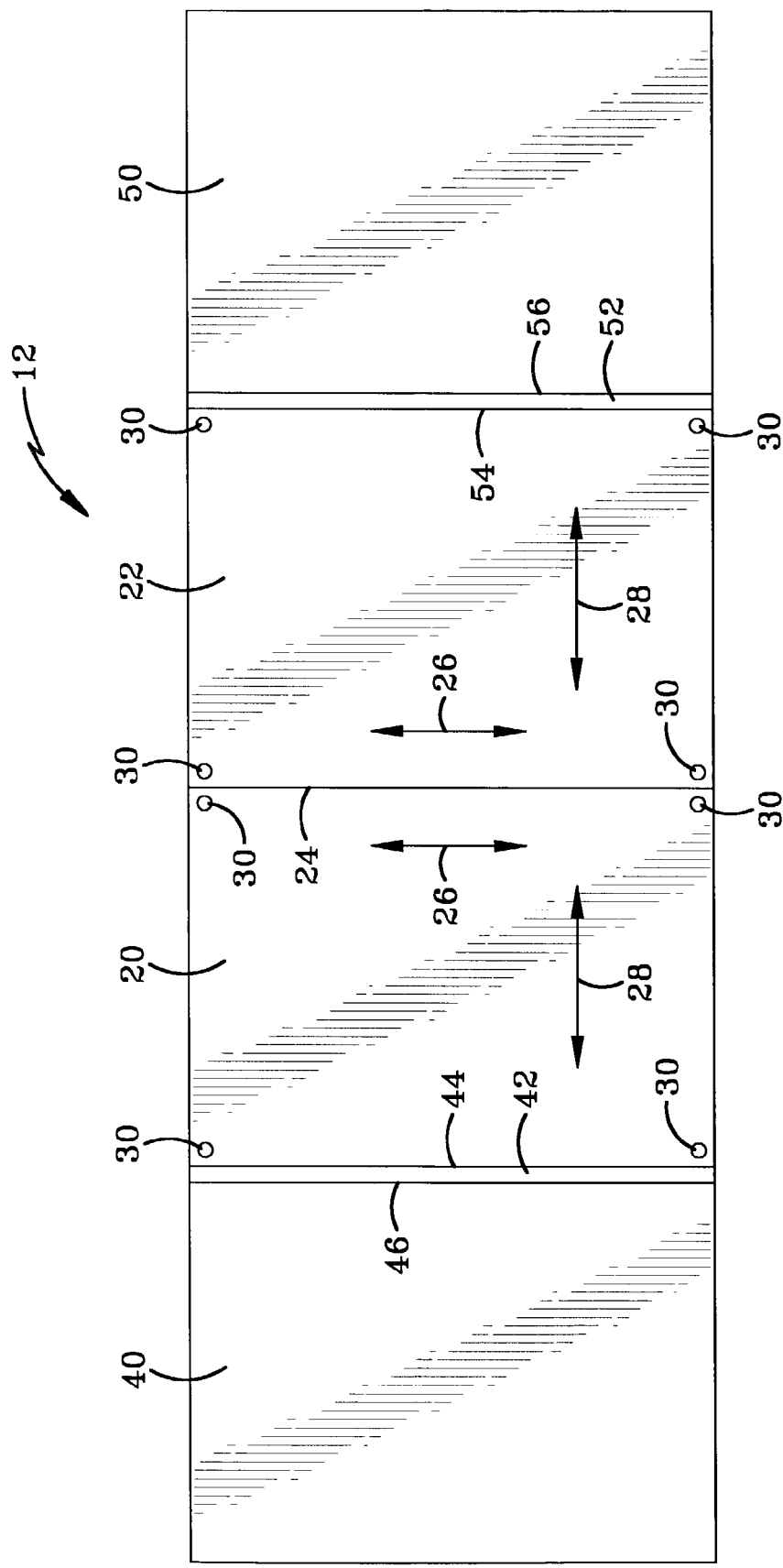
FIG. 3 is a top plan view of the cover of the first embodiment in an unfolded configuration.
Figure 5:
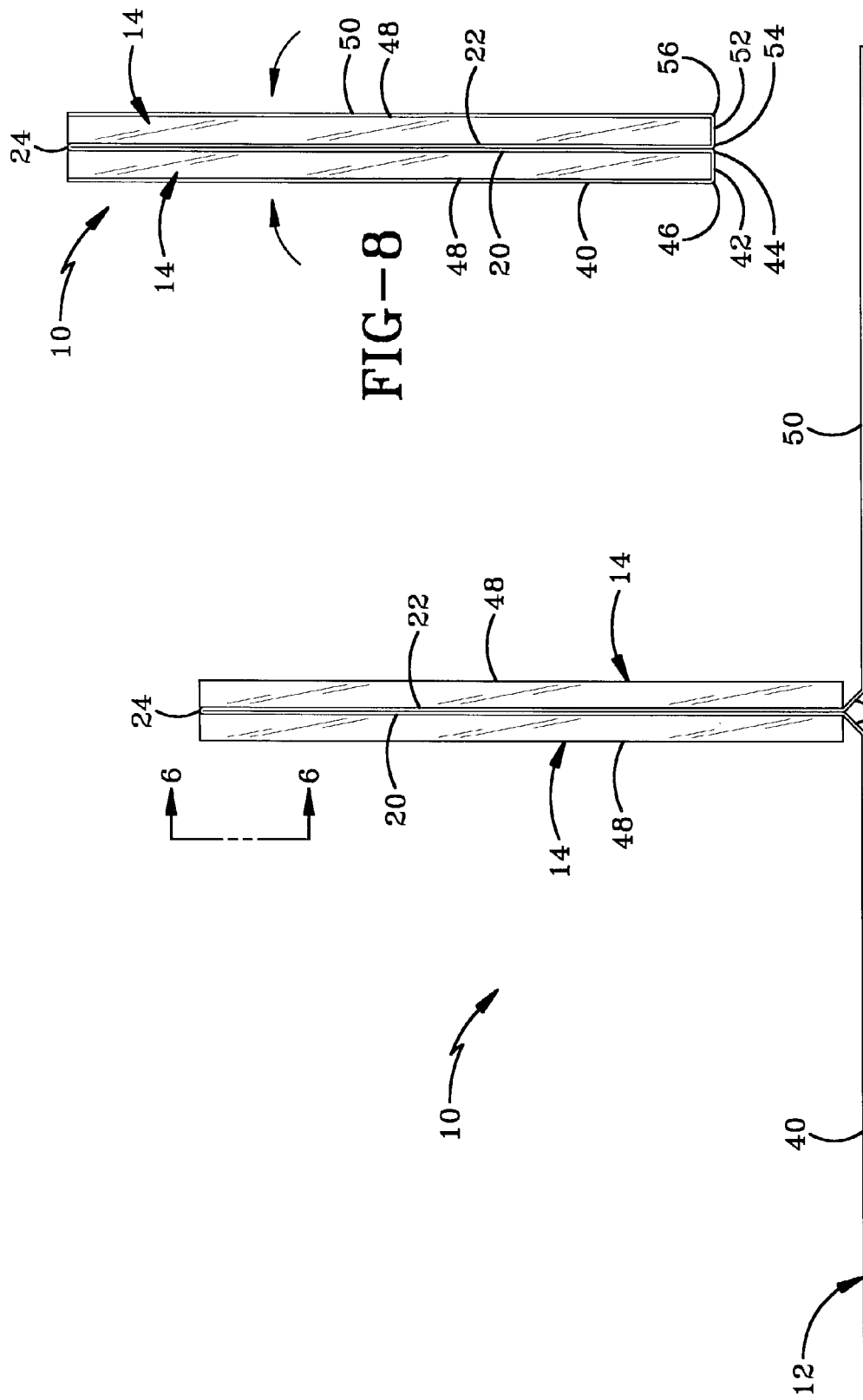
FIG. 5 is a view similar to FIG. 4 showing the media holding trays connected to the cover.

Container 10 is thus formed by folding cover 12 into the configuration depicted in FIG. 4 by folding cover panels 20 and 22 against each other about living hinge 24. Front cover panel 40 and rear cover panel 50 are then moved to the open position as depicted in FIG. 4. Trays 14 are then aligned in a back-to-back configuration with locking fingers 60 extending toward each other. Locking fingers 60 are aligned with openings 30 and trays 14 are brought together with locking finger 60 disposed through openings 30 as depicted in FIG. 5. Locking fingers 60 are locked into place as depicted in FIGS. 6 and 7. Covers 40 and 50 are then closed to form the container as depicted in FIG. 8. As described above, each tray 14 may be configured to receive and hold a CD, a DVD, a VHS tape, a cassette tape, a microchip, or any other type of item of recorded media now known in the art or developed in the future. When container 10 is formed in this manner, its rear spine is split by first living hinge 24 as depicted in FIG. 2. Container 10 includes the advantage that the user of container 10 may print material on the inside and outside surfaces of covers 40 and 50 as well as on both spine panels 42 and 52.

Another advantage presented by container 10 is that trays 14 are substantially identical thus allowing a single part to be used for both pieces. If desired, one tray 14 may include all of locking fingers 60 with the other tray including all locking ledges 62. In other embodiments of the invention, container 10 may be formed with a single tray 14 and locking fingers 60 may be snap-fit into retaining elements that simply hold the position of tray 14 with respect to cover 12. In a further embodiment of the invention, first and second inner cover panels 20 and 22 may have corners similar to the corners of the inner cover panels described below with respect to the second embodiment of the invention.

The second embodiment of the media storage container of the present invention is indicated generally by the numeral 110 in FIGS. 9–16. Media storage container 110 is designed to have the same advantages as media storage container 10 described above and is configured to use a mechanical, interlocking connection to lock the cover 112 to the media storage trays 114.

Figure 14:
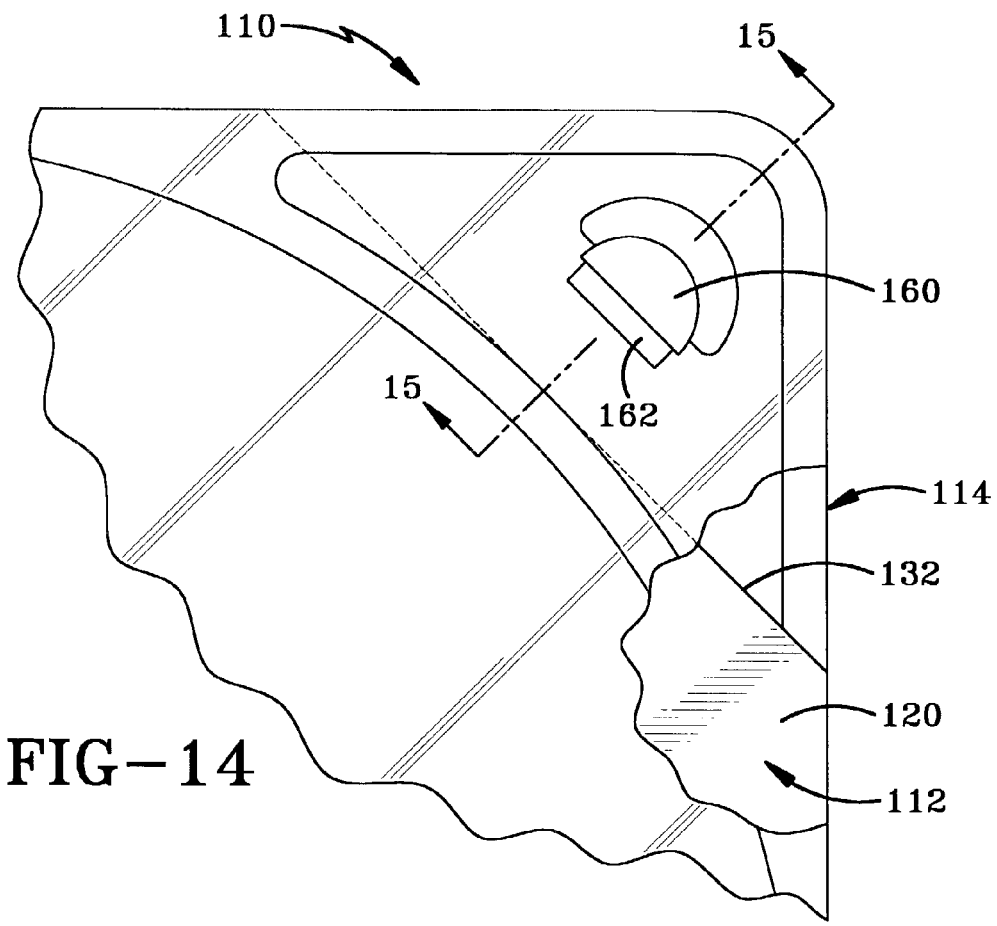
FIG. 14 is a elevation view taken along line 14—14 showing one of the locking fingers of the media holding trays.
Figure 15:
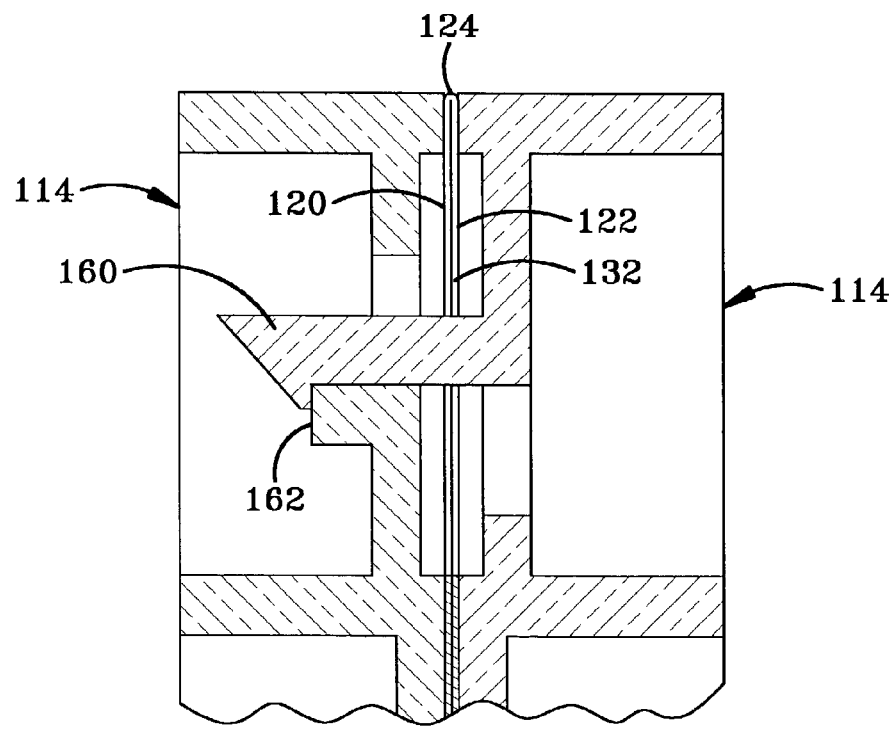
FIG. 15 is a section view taken along line 15—15 of FIG. 14.

Cover 112 includes a plurality of panels connected together with living hinges. The living hinges may be formed by any method known in the art including any of the methods described above. Cover 112 includes first and second inner cover panels 120 and 122. Inner cover panel 120 is connected to inner cover panel 122 with a first living hinge 124. As shown in FIGS. 10 and 14, the corners of inner cover panels 120 and 122 are cut away such that each inner cover panel 120 and 122 is octagonal. When each corner is cut away, a corner wall 132 is formed. Corner wall 132 may be substantially shorter than the width and height of panels 120 and 122.

Figure 13:
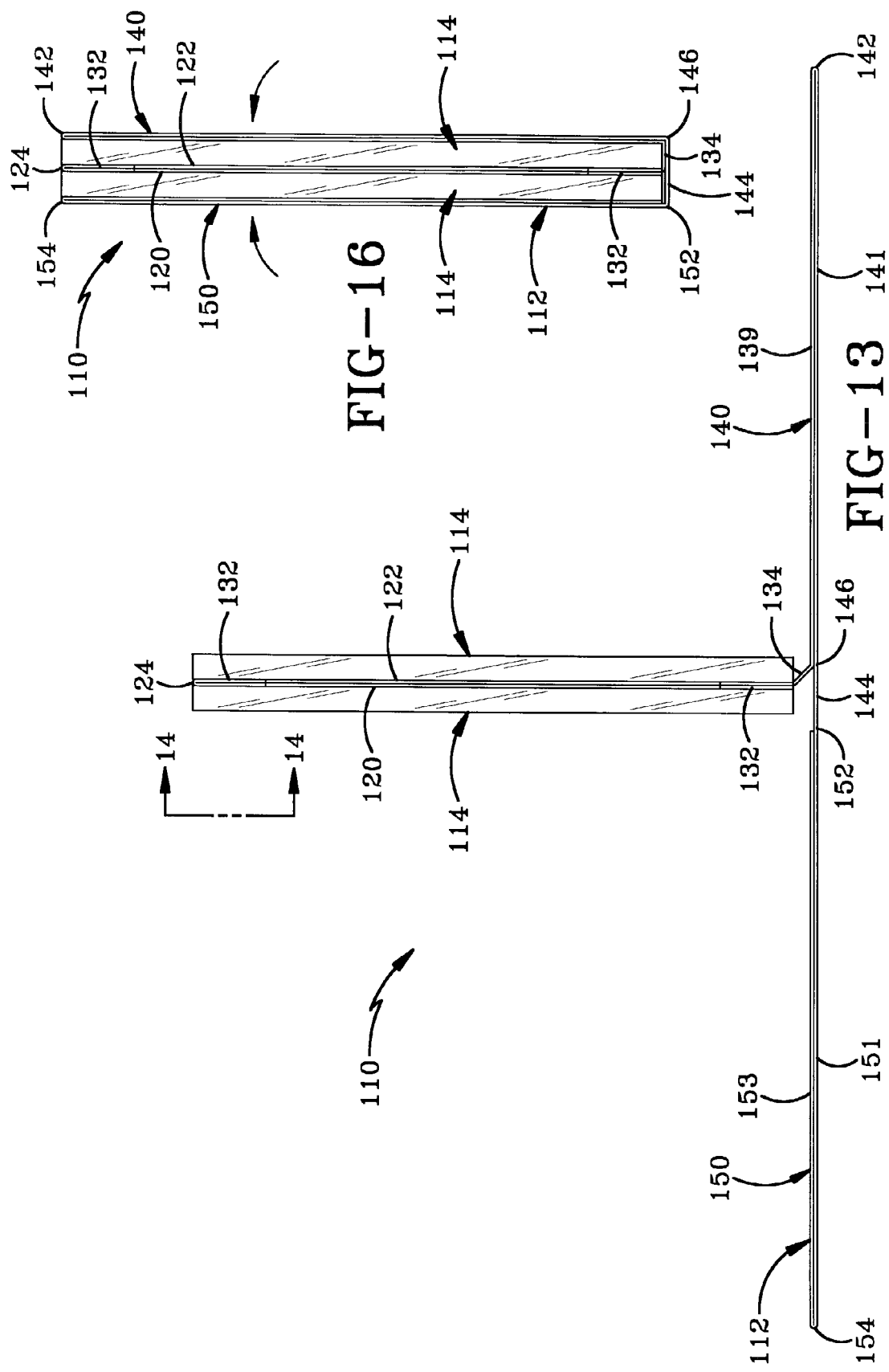
FIG. 13 is a view similar to FIG. 12 showing the media holding trays connected to the cover.

Second inner cover panel 122 is connected to an inner spine panel 134 with a second living hinge 136. A third living hinge 138 connects inner spine panel 134 to the inner panel 139 of rear cover panel 140. As shown in FIG. 13, inner spine panel 134 has a width that is slightly larger than the thickness of one tray 114 such that inner panel 139 lies directly against the outer surface of tray 114 when cover 112 is closed as depicted in FIG. 16.

In addition to inner panel 139, rear cover panel 140 includes an outer panel 141 that is connected to inner panel 139 with a fourth living hinge 142.

Outer panel 141 is connected to the outer spine panel 144 with a fifth living hinge 146. Outer spine panel 144 has a width that is slightly larger than the thickness of both trays 114 and panels 120 and 122 as depicted in FIG. 16. When cover 112 is folded together, fifth living hinge 146 is disposed immediately adjacent third living hinge 138 as depicted in FIGS. 13 and 16. If desired, inner panel 139 and outer panel 141 may be connected together with an adhesive so that they do not fall open when container 110 is in use.

An outer panel 151 of a front cover panel 150 is connected to outer spine panel 144 with a sixth living hinge 152. Front cover panel 150 also includes an inner panel 153 that is connected to outer panel 151 with a seventh living hinge 154. Panels 151 and 153 may be connected together with an adhesive so that front cover 150 does not open unintentionally.

Trays 114 are connected to cover 112 in the manner described above. As such, each tray 114 includes a pair of locking fingers 160 that snap fit onto locking ledges 162. Each locking finger 160 includes the same elements described above with respect to locking fingers 60. The difference between this embodiment and the first embodiment described above is that locking fingers 160 do not pass through openings in inner cover panels 120 and 122. Inner cover panels 120 and 122 is locked between the four locking fingers 160 because locking fingers 160 are disposed in the cut away corners. Covers 120 and 122 thus cannot move laterally or vertically out from between trays 114 once locking fingers 160 are snapped into position. If desired, inner cover panels 120 and 122 may be formed with openings 30 as described above.

Figure 9:
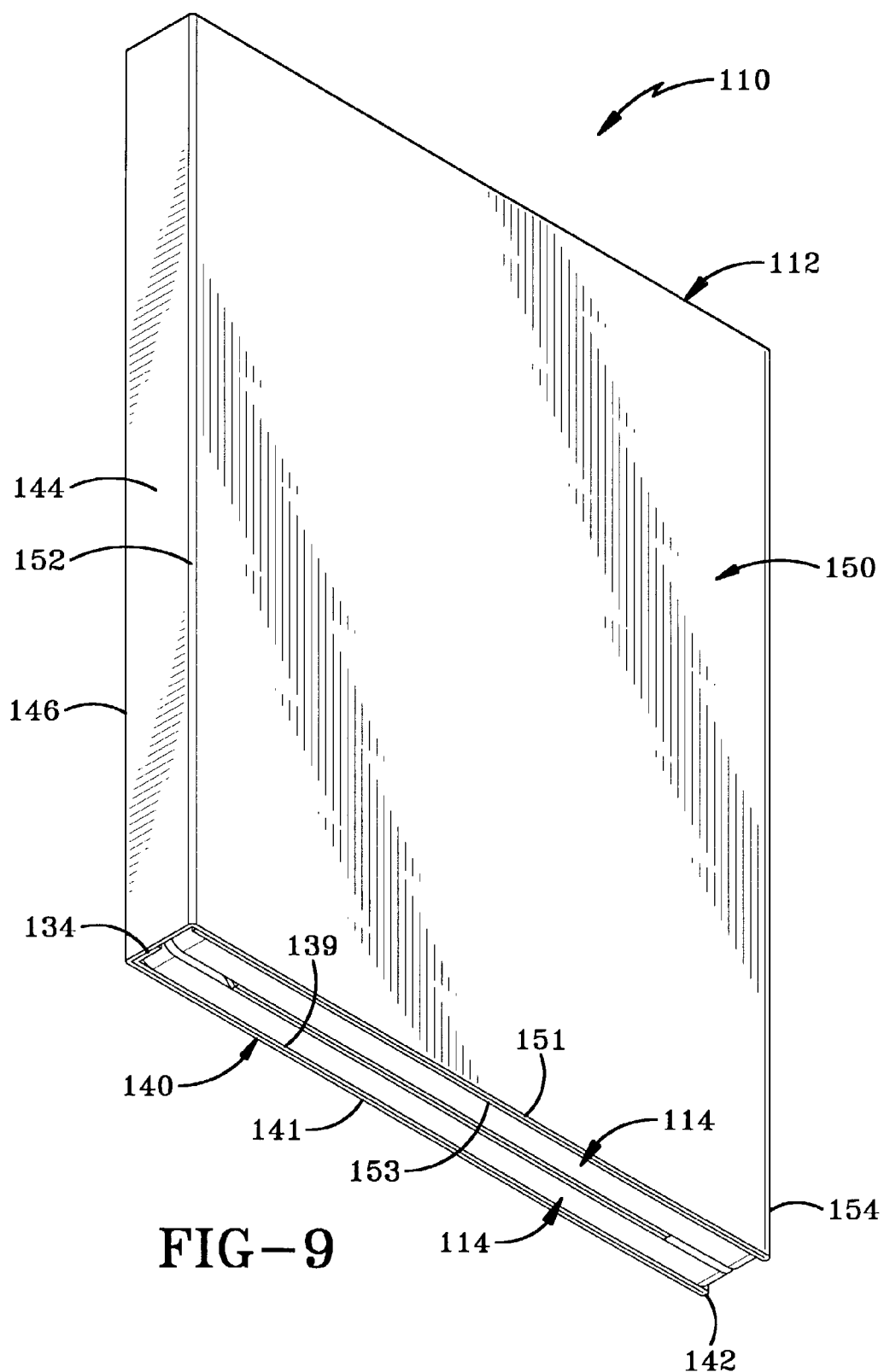
FIG. 9 is a perspective view of the second embodiment of the invention showing the spine.
Figure 12:
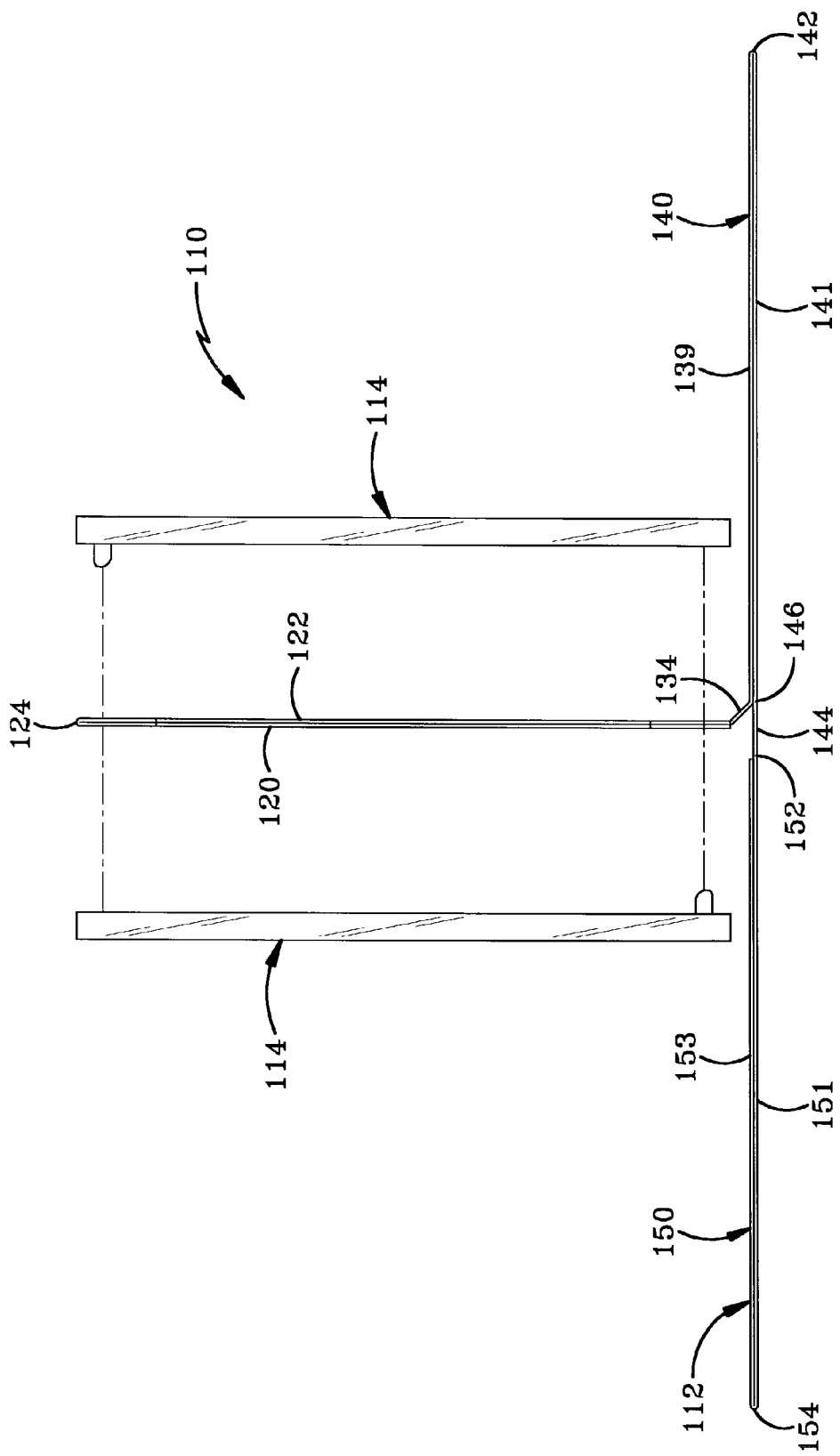
FIG. 12 is an end view of the second embodiment of the invention with the cover folded together and the disc-holding trays being aligned with the cover so that they may be connected together.

An advantage to media storage container 110 is that spine 144 is unbroken as depicted in FIG. 9 so that standard printing may be used on spine 144. The standard-sized spine 144 will thus accept large titles so that the contents of media storage container 110 may be readily discerned by the consumer.

In both of the embodiments described above, the exemplary embodiment uses trays 14 and 114 that are designed to hold a single item of recorded media. The inventors contemplate that each tray 14 and 114 may be configured to hold multiple items of recorded media such that each container 10 and 110 may be configured to hold one, two, three, four, five, six, or other numbers of items of recorded media. In still other embodiments, the inventors contemplate that covers 12 and 112 may include additional panels and additional hinges so that additional trays 14 and 114 may be held in a book-like manner.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A media storage container comprising: a cover fabricated from a flexible material; first and second media storage trays; each media storage tray including means for holding an item of recorded media; a portion of the cover being sandwiched between the first and second media storage trays the first and second trays being connected together and connected to the portion of the cover that is sandwiched between the trays to connect the trays to the cover;

the cover movable between open and closed positions; the open position of the cover adapted to allow the item of recorded media to be removed from the holding means; the portion of the cover disposed between the first and second media storage container being sandwiched between the trays when the cover is in the open and closed positions.

2. The media storage container of claim 1, wherein the cover is fabricated from a paper-based material.

3. The media storage container of claim 2, wherein the paper-based material is paperboard.

4. The media storage container of claim 1, wherein the connection between the first and second trays and the cover is free of adhesive.

5. The media storage container of claim 1, wherein the cover includes first and second inner cover panels sandwiched between the first and second media storage trays.

6. The media storage container of claim 5, wherein the first and second inner cover panels are connected together with a hinge.

7. The media storage container of claim 6, wherein the first and second inner cover panels are joined directly together with a living hinge.

8. The media storage container of claim 5, wherein the media storage trays have a common width and height; the inner cover panels having a common width and height; the width and height of the inner cover panels being substantially equal to the width and height of the media storage trays.

9. A media storage container comprising: a cover fabricated from a flexible material; first and second media storage trays; each media storage tray including means for holding an item of recorded media; a portion of the cover being disposed between the first and second media storage trays; the first and second trays being connected together and to the cover with a mechanical connection; and the cover including first and second inner cover panels disposed between the first and second media storage trays; and the media storage trays include four corners; the media storage trays being connected together at the four corners to trap the inner cover panels between the media storage trays in an interference fit.

10. The media storage container of claim 9, wherein the media storage trays are connected together with mechanical locking fingers.

11. The media storage container of claim 10, wherein the inner cover panels have openings with the locking fingers disposed through the openings.

12. A media storage container comprising: a cover fabricated from a flexible material; first and second media storage trays; each media storage tray including means for holding an item of recorded media a portion of the cover being disposed between the first and second media storage trays; the first and second trays being connected together and to the cover with a mechanical connection; and the cover including first and second inner cover panels disposed between the first and second media storage trays; and the cover further comprises front and rear cover panels that are movable between open and closed positions; the media storage trays and inner cover panels being disposed between the front and rear cover panels when the front and rear cover panels are in the closed position.

13. The media storage container of claim 12, further comprising a first spine panel connecting the front cover panel to one of the inner cover panels and a second spine panel connecting the rear cover panel to the other of the inner cover panels.

14. The media storage container of claim 1, wherein the cover comprises: an inner cover panel disposed between the first and second media storage trays; front and rear cover panels; and a spine panel connecting the front cover panel to the rear cover panel; the inner cover panel being connected to one of the front and rear cover panels.

15. A media storage container comprising: a cover fabricated from a flexible material; the cover having first and second inner cover panels and front and rear cover panels; the first and second inner cover panels being connected with a living hinge; the first inner cover panel being connected to one of the front and rear cover panels and the second inner cover panel being connected to another of the front and rear cover panels; first and second media storage trays; each media storage tray including means for holding an item of recorded media; the first media storage tray being connected to the second media storage tray with a mechanical connection; the first and second inner cover panels being disposed between the first and second media storage trays; and the first and second inner cover panels being trapped between the first and second media storage trays by the mechanical connection.

16. The media storage container of claim 15, wherein the media storage trays are connected together with locking fingers.

17. The media storage container of claim 16, wherein the locking fingers pass through the first and second inner cover panels.

18. A media storage container comprising:
a cover;
first and second media storage trays;
each media storage tray including means for holding an item of recorded media;
a portion of the cover being disposed between the first and second media storage trays;
the cover including first and second inner cover panels disposed between the first and second media storage trays;
the cover further comprises front and rear cover panels that are movable between open and closed positions;
the media storage trays and inner cover panels being disposed between the front and rear cover panels when the front and rear cover panels are in the closed position;
the media storage trays include four corners; and
the media storage trays being connected together at the four corners to trap the inner cover panels between the media storage trays in an interference fit.

19. The media storage container of claim 18, wherein the cover is fabricated from a paper-based material.

20. The media storage container of claim 18, wherein the connection between the first and second trays and the cover is free of adhesive.

21. The media storage container of claim 18, wherein the first and second inner cover panels are connected together with a hinge.

* * * * *